(12) United States Patent
Bechtel et al.

(10) Patent No.: US 7,805,209 B2
(45) Date of Patent: Sep. 28, 2010

(54) LIGHT BARRIER HAVING SEPARATE OUTPUT SIGNALS

(75) Inventors: Andreas Bechtel, Heidelberg (DE); Ulrich Grimm, Dielheim (DE); Carsten Huschle, Rettigheim (DE); Lutz Pfaff, Eppelheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 296 days.

(21) Appl. No.: 11/365,038

(22) Filed: Mar. 1, 2006

(65) Prior Publication Data

US 2006/0212144 A1    Sep. 21, 2006

(30) Foreign Application Priority Data

Mar. 1, 2005    (DE) .................. 10 2005 009 124

(51) Int. Cl.
*G05B 9/02* (2006.01)
(52) U.S. Cl. .................................. 700/79; 250/221
(58) Field of Classification Search .............. 700/59, 700/258, 21, 79, 80; 250/221
See application file for complete search history.

(56) References Cited

U.S. PATENT DOCUMENTS

| | | | | |
|---|---|---|---|---|
| 5,015,840 A | * | 5/1991 | Blau | 250/221 |
| 5,198,661 A | * | 3/1993 | Anderson et al. | 250/221 |
| 5,218,196 A | * | 6/1993 | Dogul et al. | 250/221 |
| 5,944,431 A | * | 8/1999 | Becker et al. | 400/708 |
| 6,323,948 B2 | * | 11/2001 | Haque et al. | 356/429 |
| 6,965,109 B2 | * | 11/2005 | Iwasawa | 250/341.7 |
| 6,979,813 B2 | * | 12/2005 | Avril | 250/221 |
| 2003/0117023 A1 | * | 6/2003 | Avril | 307/39 |
| 2003/0206105 A1 | * | 11/2003 | Grebenshchikov et al. | 340/556 |
| 2004/0124341 A1 | * | 7/2004 | Parstorfer et al. | 250/221 |

FOREIGN PATENT DOCUMENTS

| | | |
|---|---|---|
| DE | 197 30 341 A1 | 1/1999 |
| DE | 299 00 149 U1 | 3/1999 |
| DE | 100 46 863 C1 | 1/2002 |
| DE | 203 15 358 U1 | 12/2003 |
| EP | 08 01 260 A1 | 10/1997 |

OTHER PUBLICATIONS

Högener, Jürgen: "Sicherheitsüberwachung von der Maschinensteuerung trennen", Automation Elektrische Ausrüstung, Maschinenmarkt 2001, vol. 45, pp. 42-44, 46, 47.
Statement of Relevance for "Sicherheitsüberwachung von der Maschinensteuerung trennen".
German Office Action dated May 28, 2008.

* cited by examiner

*Primary Examiner*—Ryan A Jarrett
(74) *Attorney, Agent, or Firm*—Laurence A. Greenberg; Werner H. Stemer; Ralph E. Locher

(57) ABSTRACT

A contact-less safety device, i.e., a safety device operating without contact has an interface for the transmission of output signals to connectable appliances for signal processing. The output signals from the individual sensors of the safety device operating without contact can be transmitted separately via the interface.

9 Claims, 2 Drawing Sheets

| | |
|---|---|
| 15 | Operating Keys |
| 16 | Light Barrier Muting Signal |
| 17 | Display |
| 18 | Limit Switch |

LIGHT BARRIER HAVING SEPARATE OUTPUT SIGNALS

BACKGROUND OF THE INVENTION

Field of the Invention

The present invention relates to a safety device operating without contact and having an interface for the transmission of output signals to connectable appliances for signal processing.

Many production machines in industry have regions which represent potential sources of hazard for the operating personnel. Such hazardous regions therefore have to be secured appropriately with respect to the operating personnel. This can be achieved by fitting protective gratings and similar mechanically acting devices, so that in principle the operating personnel are provided with a defense against access into the hazardous region. However, since such hazardous regions nevertheless have to be entered by the operating personnel for specific purposes, such as for maintenance or for the removal of workpieces, fixed mechanical protective devices are not suitable for this purpose. Safety systems operating without contact, such as light barriers, have already been used for such regions for a long time.

German patent DE 103 10 236 B3 (WO 2004/078626 A1) describes the use of light barriers in order to secure hazardous regions of a sheet-processing machine. There, by means of light barriers, the sheet delivery, which is accessible from three sides, is secured against the unauthorized entry of persons. To this end, a plurality of light barriers are fitted one above the other on each side of the sheet delivery so that no person can move unnoticed into the secured region between the light barriers. As soon as the light beam from a light barrier is interrupted, a signal is output in order to stop the drive of moving parts which could endanger the operating personnel in the deliverer. In addition, there is the possibility for the operating personnel to take one or more light barriers out of operation during a short predefined time interval, in order to be able to intervene in specific regions without the emergency shutdown of the press or the deliverer occurring. In order to effect emergency shutdown of a press, the safety devices, such as the light barriers, must be incorporated in the machine control system. In the light barriers which can be obtained at present, the signals from the individual light barriers are evaluated in the light barrier itself, in order to determine whether an object or a person enters the hazardous region. If such an object or a person is detected, a signal is transmitted to the control of the press in order to effect emergency shutdown. This has the disadvantage that the evaluation of the individual sensors takes place in the light barrier itself and, in this way, the machine control system can only process the signal relating to further operation or to the emergency shutdown.

SUMMARY OF THE INVENTION

It is accordingly an object of the invention to provide a light barrier device with separate output signals which overcomes the above-mentioned disadvantages of the heretofore-known devices and methods of this general type and which provides for a safety device operating without contact that permits more extensive processing of the output signals originating from the individual sensors.

With the foregoing and other objects in view there is provided, in accordance with the invention, a contact-less safety device, comprising:

- a safety device operating without contact, said safety device having a plurality of sensors configured to generate individual output signals; and
- an interface for separately transmitting the output signals of the individual said sensors to connectable appliances for signal processing.

In other words, the objects of the invention are achieved with a contact-less safety device, i.e., a safety device operating without contact, such as a light barrier, that is linked via an interface to the control computer of a machine whose hazardous regions are to be monitored. Such a machine can be, in particular, a press having the hazardous regions in the feed and delivery regions. The control computer of such a press is normally integrated into the machine itself or set up as a separate operating unit beside the machine. A safety device operating without contact, such as a light barrier, has a plurality of sensors which comprise transmitters which emit a light beam and receivers which are located opposite the emitted light beam. As soon as a light beam is interrupted, the opposite receiver is darkened and the affected sensor in the receiver outputs a signal. Thus, each receiver is able to output a corresponding signal which comprises two states, "light on" and "light off". As opposed to the prior art, where these signals are evaluated directly in the light barrier and, by using specific criteria, such as the number of light beams interrupted, it is defined whether a signal relating to emergency shutdown has to be transmitted to the machine controller, according to the invention the output signals from the individual sensors are transmitted to the machine controller via an interface and the associated cable. In the machine controller, the individual output signals from the sensors in the light barrier can then be evaluated separately as appropriate. It is thus possible to implement the criteria for a safety shutdown in the control computer of the machine without being bound to the safety strategy developed by the manufacturer of the light barrier.

In accordance with a first refinement of the invention, provision is made for it to be possible for the separate output signals to be transmitted serially by way of the interface to an apparatus for signal processing. Expediently, recourse is had here to serial interfaces from computer construction, such as RS 485. These serial interfaces are fast enough to transmit the states of the individual sensors of a light barrier one after another in the required minimum time. Information transmitted via a serial interface can be processed more easily by a computer than, for example, information transported via a parallel interface. The use of a serial interface is therefore more cost-effective.

Provision is further made for the transmission protocol of the output signals transmitted via the interface to ensure single fault security. The output signals from the individual sensors of a light barrier, transmitted one after another via the interface, have to be monitored for transmission errors for safety reasons. If, for example, the state of a light path of a light barrier were to be transmitted wrongly, this could give rise to hazards, since it would then possibly not be detected in good time that a person had intervened in the hazardous region. In order to avoid such hazards, the data transmission via the interface must be such that even the occurrence of only one error during the transmission of the output signals from the individual sensors of the light barrier is detected. This can be done by means of an appropriate single fault security transmission protocol, in which the data is transmitted via the interface in coded form such that even a single error is sufficient, for example, to trigger an emergency shutdown. Therefore, error-free transmission of the data is ensured as long as the machine is running, since otherwise an emergency shutdown is carried out.

Provision can also be made for the output signals transmitted via the interface to be able to be assigned to individual sensors of a light barrier. If the origin of the output signals transmitted is encoded appropriately, these encoded output signals can be assigned unambiguously to the sensors of the light barrier from which they originate. Thus, the machine controller knows exactly which of the existing light barriers or sensors of a light barrier have been interrupted. It is therefore possible to process the origin of a received output signal from an individual sensor immediately in the machine controller, with the knowledge of its origin.

Advantageously, provision can additionally be made for the control computer to have at least two computer units operating independently of each other, of which one processes the signals from the operating path and the other the signals from the safety path. In order to satisfy the necessary safety requirements, it is necessary for the control computer to be designed redundantly. The incoming data is therefore processed in parallel by two independent computers in the control computer, so that, in the event of failure of the operating path computer in particular, the second computer of the safety path continues to be available. The two computers communicate with each other via a data line, so that one computer immediately experiences the failure or any abnormalities of the other. The remaining computer can then be used for stopping the machine to be controlled safely and, in particular, for subjecting it to an emergency shutdown.

Furthermore, provision can advantageously be made that, during the commissioning of the control computer, a connected safety device operating without contact is subjected to a test in a plausibility check. During the commissioning of each computer, specific interrogation routines are in principle carried out at the start. In the control computer of a machine, operating safety plays a major part, so that, in particular the circuits and programs responsible for safety have to be tested for complete serviceability before being commissioned. In addition to the control computer itself, it is of great advantage if the connected sensors, such as a light barrier, for example, are also tested for serviceability. For instance, the individual sensors of a light barrier can be interrogated one after another in accordance with a test pattern in a plausibility check, the incoming test signals from the sensors being evaluated appropriately at the control computer. Should deviations from the test pattern stored in the control computer be determined during this plausibility check, then this permits the conclusion to be drawn that there is a malfunction of the light barrier. In this case, the machine will not be started up at all or, if the test is carried out at regular intervals during operation, the machine is transferred into a safe operating state and, if appropriate, shuts down immediately. By using such a check of the serviceability of the light barrier, even carried out during operation, it is ensured that, for example, even contamination during operation does not impair the safety of the machine.

In the following text, the invention will be described and explained in more detail using an exemplary embodiment and a number of figures. The exemplary embodiment relates to the use of safety devices operating without contact in presses. However, it is clear that these safety devices operating without contact can also be employed in other machines, in particular folding machines or other machines for the further processing of printing materials. In general, the invention can be used in all light barriers which are connected to a control computer. The invention is not limited to the use of light barriers as sensors either; it is equally well possible for other sensors such as distance measuring ultrasonic sensors to be used.

Other features which are considered as characteristic for the invention are set forth in the appended claims.

Although the invention is illustrated and described herein as embodied in a light barrier having separate output signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
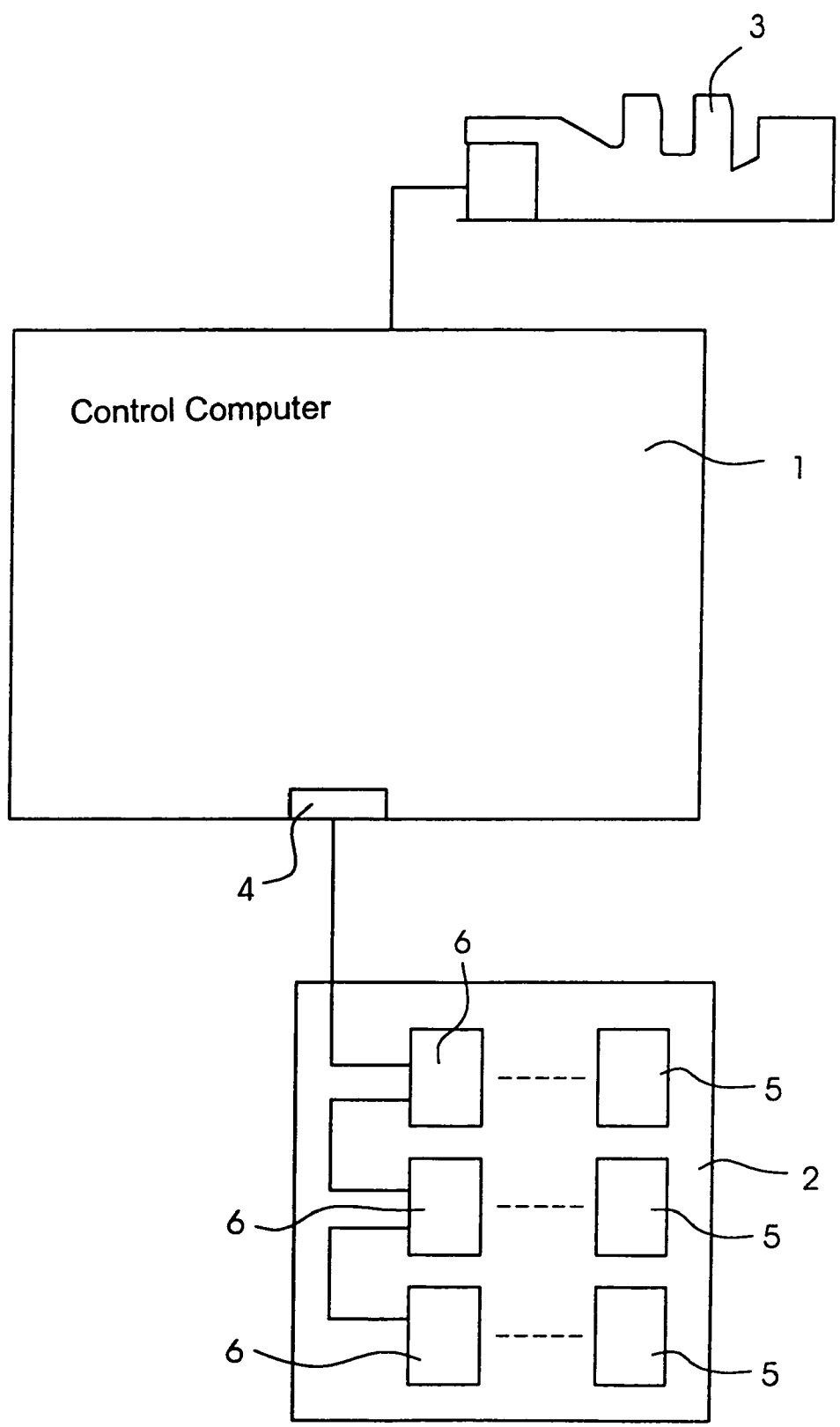
FIG. 1 is a diagram illustrating a system in which a control computer is connected to a printing press and a light barrier device.

Referring now to the figures of the drawing in detail and first, particularly, to FIG. 1 thereof, there is shown a printing machine or press 3 which has one or more hazardous regions. The hazardous regions of the press 3 are secured by way of one or more light barriers 2, which are connected to a control computer 1. The control computer 1 controls the complete operation of the press 3 and is therefore also responsible for any safety shutdown of the press 3. Signals originating from the light barrier 2 are transmitted via a serial interface 4 to the control computer 1. The light barrier 2 comprises a plurality of sensors 5, 6. Half of the sensors are constructed as light transmitters 5 and the other half of the sensors are constructed as light receivers 6. The light transmitters 5 emit light continuously, which falls onto the light-sensitive receivers 6 located opposite. As soon as a person or an object interrupts a light beam, the corresponding light receiver 6 is shadowed as a result.

Shadowing of the receiver 6 leads to the generation of a signal. If the light receiver 6 is designed as a photodiode, for example, its electric resistance increases by a multiple when it is shadowed, so that an associated circuit has a considerably higher electric resistance. This can then be passed on as an output signal to the serial interface 4. In this way, all of the light receivers 6 are able to pass on their state, which expediently comprises the two states "light on" and "light off", to a control computer 1 via the serial interface 4. In this way, it is possible to communicate the states of all the light receivers 6 to the control computer 1.

Figure 2:
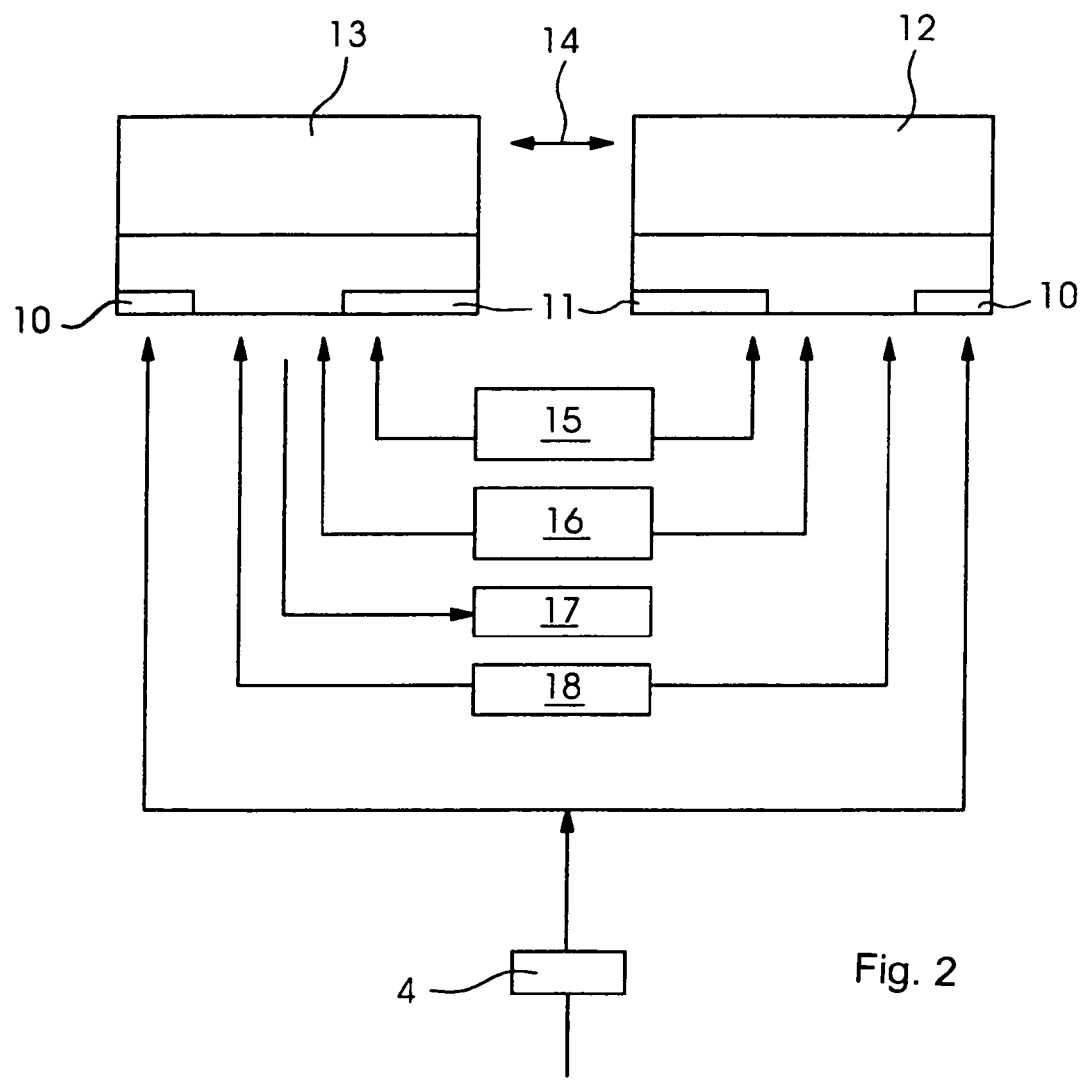
FIG. 2 is a diagram of the structure of a control computer according to the present invention.

The interior of the control computer 1 is illustrated schematically in FIG. 2. The output signals from the light barrier 2 transmitted via the serial interface 4 are supplied in the control computer 1 firstly to a first computer 12 for the safety path and secondly to a further computer 13 for the operating path. To this end, the two computers 12, 13 each have an internal serial interface 10 in order to be able to process the data coming in from the external serial interface 4. In principle, the two computers 12, 13 can be of identical construction. In addition to the connection of the serial interface 10, the computers 12, 13 also have digital input and output units 11. Via the digital input and output units 11, command inputs from the operating personnel or information from further sensors of the connected press 3 can be transmitted to the computer. For example, operating keys 15, with which the operating personnel can carry out specific adjustments on the control computer 1, are connected via the digital input and output units 11. A further input is provided for the so-called muting signal of the light barrier 16. By way of the muting signal, the processing of the output signals from specific light receivers 6 of the light barrier 2 can be interrupted for a short time. This is required, for example, if specific workpieces, which are to be distinguished unambiguously from persons, have to be introduced into the hazardous region during operation. Using an appropriate sensor in front of the light barrier 2, the object is scanned and, if a permissible object is detected, the output signals from the corresponding light barrier 6 are no longer taken into account by the computers 12, 13. In this way, the entry of a permitted object does not lead to emergency shutdown of the press 3. The output signal from such a muting sensor can be processed by the computers 12, 13 as a muting signal 16.

Furthermore, a display 17 is connected to the operating path computer 13, at least, for the purpose of operation. On the display 17. The current operating states of the press 3 can be seen, and it is possible for the operating personnel to change the settings indicated, if appropriate via operating keys 15. For example, for sensors of the press 3, the computers 12, 13 have an input for the output signal from a limit switch 18. Such a limit switch 18 is contained in the press 3 in the feeder and deliverer, for example, where reaching the end position of the stack lifting mechanism triggers a limit switch 18 in order to prevent further movements of the stack lifting mechanism beyond the end position. The signal from such a limit switch 18 can likewise be processed in the computers 12, 13 in order to initiate appropriate actions.

The computers 12, 13 communicate with each other via an internal data interface 14, in order to be able to detect any deviations from each other or even the failure of a computer. In this case, the remaining functioning computer can transfer the press 3 into a safe operating state and, if appropriate, shut it down in an emergency. The output signals from the individual sensors 6 can additionally be dispatched via the serial interface 4 encoded in accordance with a specific pattern. By means of the specific coding, it is possible to detect the occurrence of errors during the transmission of the data via the serial interface 4 and to shut down the press 3 in an emergency. This therefore ensures that even an erroneous transmission of the data from the sensors 6 to the control computer 1 via the serial interface 4 does not impair the safety of the press 3.

Furthermore, the output signals coming from the sensors 6 can be allocated appropriate identifiers so that, following the transmission of the data via the serial interface 4, the output signals from the individual sensors 6 can be assigned unambiguously to the respective sensor 6. In this way it is also possible, for example, to indicate the function of the individual light barriers on the display 17 and, in the event of technical problems at the light barrier 2, to indicate the precise location of the sensor 6 affected by a problem. For example, in this way the contamination of one or more sensors can also be assigned precisely to the respective sensor, so that the operating personnel can detect on the display 17 which sensor or sensors are affected by contamination and have to be cleaned. With the present invention, therefore, not only can the safety of a monitored machine 3 be improved but there are also advantages in fault finding.

This application claims the priority, under 35 U.S.C. §119, of German patent application No. 10 2005 009 124.5, filed Mar. 1, 2005; the prior application is herewith incorporated by reference in its entirety.

We claim:

1. A contact-less safety device, comprising:
   a safety device operating without contact, said safety device being a light barrier having a plurality of sensors, said sensors being transmitters configured for continuously emitting respective light beams and receivers disposed opposite the emitted light beams, said sensors configured to generate individual output signals; and
   an interface for separately transmitting the output signals of said receivers of individual said sensors to connectable appliances for signal processing, said sensors with said receivers forming part of said light barrier, and the output signals transmitted via said interface being assignable to individual ones of said receivers of said sensors of said light barrier.

2. The safety device according to claim 1, wherein said interface is configured to serially transmit the separate output signals to an apparatus for signal processing.

3. The safety device according to claim 1, wherein output signals are transmitted via said interface with a transmission protocol ensuring single fault security.

4. A control computer for a printing-material processing machine, the control computer comprising at least one external interface for a connecting a contact-less safety device according to claim 1.

5. The control computer according to claim 4, comprising at least two computer units operating independently of each other, one of said computer units processing signals from an operating path and another of said computer units processing signals from a safety path.

6. The control computer according to claim 4, wherein said control computer, during a commissioning thereof, is connected to a safety device operating without contact and the safety device is subjected to a test in a plausibility check.

7. A printing press having a control computer according to claim 4.

8. In a printing press, the contact-less safety device according to claim 1.

9. In a machine for further processing printing materials, the contact-less safety device according to claim 1.

* * * * *